_(12)_ United States Patent
Bajric et al.

(10) Patent No.: US 9,177,076 B2
(45) Date of Patent: Nov. 3, 2015

(54) REDUCING AD IMPACT TO BROWSER ONLOAD EVENT

(75) Inventors: Dinko Bajric, Kirkland, WA (US); Gregory Bershansky, Sammanish, WA (US); Alex Polak, Sammanish, WA (US); Paul Roy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 960 days.

(21) Appl. No.: 13/343,746

(22) Filed: Jan. 5, 2012

(65) Prior Publication Data
US 2013/0179767 A1   Jul. 11, 2013

(51) Int. Cl.
G06F 17/20 (2006.01)
G06F 17/30 (2006.01)
G06F 17/22 (2006.01)

(52) U.S. Cl.
CPC ...... *G06F 17/30902* (2013.01); *G06F 17/2247* (2013.01)

(58) Field of Classification Search
CPC .................................................. G06F 17/2247
USPC ........................................................ 715/240
See application file for complete search history.

(56) References Cited

U.S. PATENT DOCUMENTS

| | | | |
|---|---|---|---|
| 6,694,145 B2 * | 2/2004 | Riikonen et al. | 455/502 |
| 6,983,331 B1 * | 1/2006 | Mitchell et al. | 709/246 |
| 7,984,113 B2 * | 7/2011 | Steinwagner | 709/219 |
| 8,103,742 B1 * | 1/2012 | Green | 709/218 |
| 8,185,610 B2 * | 5/2012 | Goff et al. | 709/219 |
| 8,205,006 B2 * | 6/2012 | Vanover et al. | 709/232 |
| 8,239,491 B1 * | 8/2012 | Tsun | 709/219 |
| 8,255,463 B2 * | 8/2012 | Peters et al. | 709/205 |
| 8,266,281 B1 * | 9/2012 | Carlson et al. | 709/224 |
| 8,510,167 B2 * | 8/2013 | Lisbakken | 705/14.71 |

(Continued)

OTHER PUBLICATIONS

"Best Practices on Web Site Performance Optimization", Retrieved on: Oct. 12, 2011, Available at: https://community.dynatrace.com/community/display/PUB/Best+Practices+on+Web+Site+Performance+Optimization.

(Continued)

*Primary Examiner* — Cesar Paula
*Assistant Examiner* — Mohammed-Ibrahim Zuberi
(74) *Attorney, Agent, or Firm* — Joann Dewey; Danielle Johnston-Holmes; Micky Minhas (57) ABSTRACT

Various embodiments pertain to techniques for decreasing an amount of time to a browser onload event by asynchronously loading web page content. In various embodiments, frames are utilized to trigger an onload event before all content in a web page is loaded. In some embodiments, various components of the web page, such as advertisements, are provided in frames, and the loading of the components is triggered by an onload event of the frame. In other words, an empty frame can be provided for the purposes of triggering both a frame onload event and an onload event for the web page. The frame onload event can cause a page script to be executed effective to load the components into the frames. In some embodiments, two or more nested frames are utilized to provide asynchronous loading of web page components while maintaining compatibility of the advertisement or multimedia items and the web page.

19 Claims, 7 Drawing Sheets

(56) References Cited

U.S. PATENT DOCUMENTS

| | | | | |
|---|---|---|---|---|
| 2002/0103830 | A1* | 8/2002 | Hamaide et al. | 707/513 |
| 2003/0163372 | A1* | 8/2003 | Kolsy | 705/14 |
| 2006/0015594 | A1* | 1/2006 | Kontamsetty et al. | 709/221 |
| 2006/0218490 | A1* | 9/2006 | Fink | 715/517 |
| 2007/0300064 | A1* | 12/2007 | Isaacs et al. | 713/168 |
| 2008/0127217 | A1* | 5/2008 | Wang | 719/318 |
| 2009/0070190 | A1* | 3/2009 | Gorty et al. | 705/10 |
| 2010/0281400 | A1* | 11/2010 | Forutanpour et al. | 715/760 |
| 2010/0299205 | A1* | 11/2010 | Erdmann et al. | 705/14.54 |
| 2011/0066676 | A1* | 3/2011 | Kleyzit et al. | 709/203 |
| 2012/0054596 | A1* | 3/2012 | Kroger et al. | 715/234 |
| 2012/0254722 | A1* | 10/2012 | Newton et al. | 715/234 |
| 2012/0317238 | A1* | 12/2012 | Beard | 709/219 |
| 2013/0055063 | A1* | 2/2013 | Mondal et al. | 715/234 |
| 2013/0212465 | A1* | 8/2013 | Kovatch | 715/234 |

OTHER PUBLICATIONS

Nielson, et al., "Benchmarking Modern Web Browsers", In Proceedings of 2nd IEEE Workshop on Hot Topics in Web Systems and Technologies, 2008, pp. 1-6.

Butkiewicz, et al., "Understanding Website Complexity: Measurements, Metrics, and Implications", Published on: Nov. 2-4, 2011, Available at: http://www.cs.ucr.edu/~harsha/papers/imc11.pdf.

"Mobile Site Optimization", Published on: Sep. 2011, Available at: http://www.strangeloopnetworks.com/assets/PDF/downloads/Whitepaper-Mobile-Site-Optimization.pdf.

"IAB—Ad Load Performance Best Practices", Published on: Oct. 2008, Available at: http://www.iab.net/media/file/IAB_Ad_Load_Performance_BP_FINAL.pdf.

"IAB—Best Practices for Rich Media Ads in Asynchronous Ad Environments", Published on: Oct. 2008, Available at: http://www.iab.net/media/file/rich_media_ajax_best_practices.pdf.

* cited by examiner

REDUCING AD IMPACT TO BROWSER ONLOAD EVENT

BACKGROUND

As a web page is loaded by a web browser, the web browser provides various visual indications to a user that the web page has not fully loaded. The indications can be, for example, a status bar message such as "loaded 17 out of 23 items" or displaying an hourglass icon in addition to or in place of a mouse cursor. Such indications can be provided to a user until an "onload" event is triggered, signaling that the web page has no pending components to be loaded.

A time to achieve an onload event can be a measure of website performance. Specifically, longer load times can cause a user perception that a website exhibits poor performance which, in turn, can lead to the user abandoning the website and defecting to other, more responsive websites. In order to reduce the time to achieve the onload event, some websites have delayed the loading of one or more components, such as advertisements, until after the onload event has been triggered. However, by not loading advertisements until after the onload event, the websites can also experience a decrease in advertisement engagement, (e.g., clicks on advertisements, views, etc.), which can lead to difficulties in attracting advertisers and negotiating advertisement rates, as well as decreased advertising revenue.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments pertain to techniques for decreasing an amount of time to a web page onload event by asynchronously loading web page content. In various embodiments, frames are utilized to trigger an onload event before all content in a web page is loaded. In some embodiments, various components of the web page, such as advertisements or multimedia content items, are provided in frames, and the loading of the components is triggered by an onload event of the frame. In other words, an empty frame can be provided for the purposes of triggering both a frame onload event and an onload event for the web page. The frame onload event can cause a page script to be executed effective to load the components into the frames. In some embodiments, two or more nested frames are utilized to provide asynchronous loading of web page components while maintaining compatibility of the advertisement or multimedia items and the web page.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments pertain to techniques for decreasing an amount of time to a browser onload event by asynchronously loading web page content. In various embodiments, frames, such as inline frames or iframes, are utilized to trigger an onload event before all content in a web page is loaded. In some embodiments, various components of the web page, such as advertisements or multi-media content items, are provided in frames, and the loading of the components is triggered by an onload event of the frame. In other words, an empty frame can be provided for the purposes of triggering both a frame onload event and an onload event for the web page. The frame onload event can cause a page script to be executed effective to load the components into the frames. In some embodiments, two or more nested frames are utilized to provide asynchronous loading of web page components while maintaining compatibility of the advertisement or multimedia items and the web page.

In the discussion that follows, a section entitled "Example Operating Environment" describes an operating environment in accordance with one or more embodiments. Next, a section entitled "Example Embodiments" describes various embodiments for asynchronously loading web page content to decrease an amount of time to a browser onload event. Finally, a section entitled "Example Device" describes a device that can be used to implement one or more embodiments.

Consider now, an example operating environment in accordance with one or more embodiments.

Example Operating Environment

Figure 1:
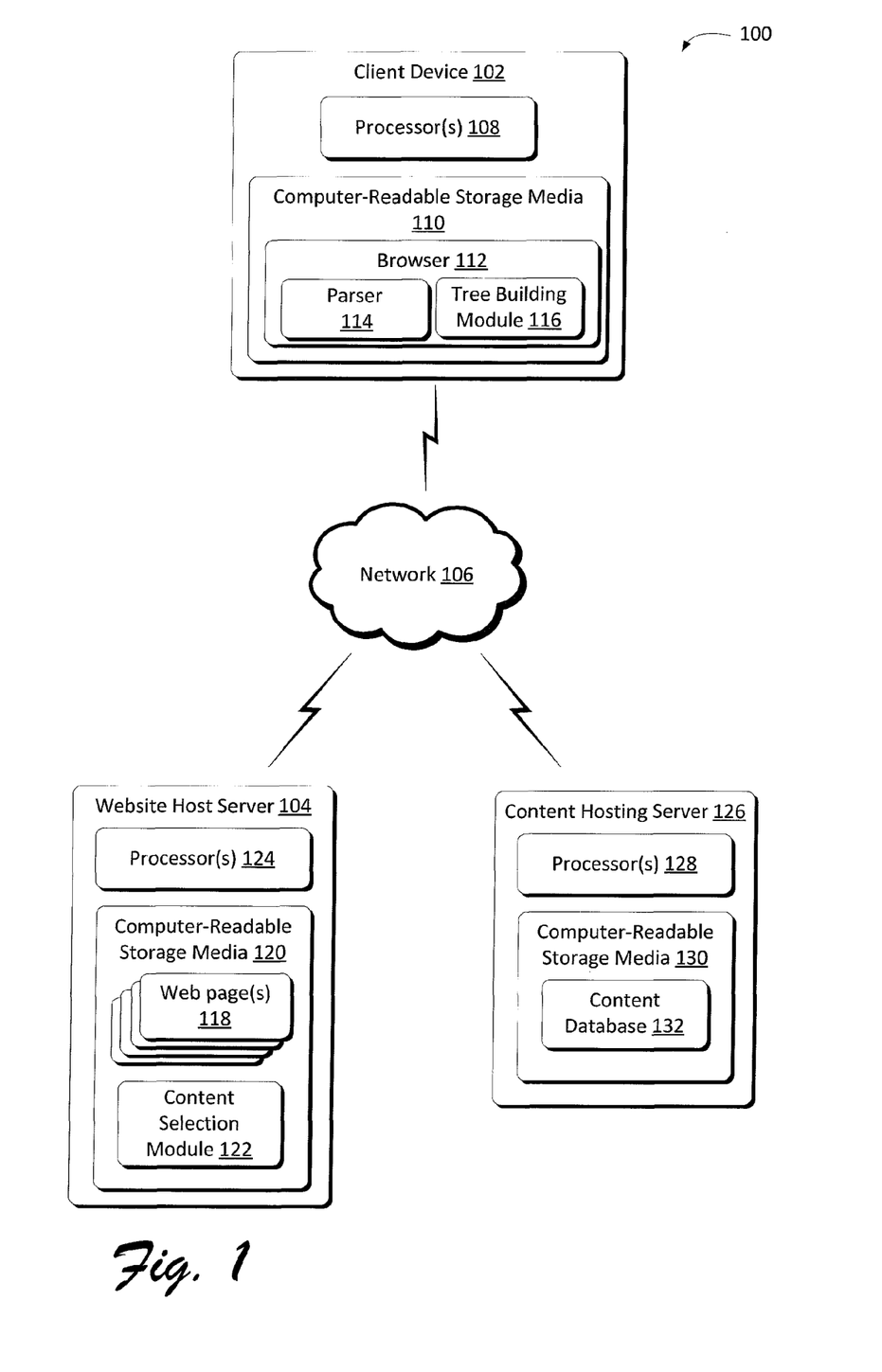
FIG. 1 is an illustration of an example environment in accordance with one or more embodiments.

FIG. 1 is an illustration of an example environment 100 in accordance with one or more embodiments. Environment 100 includes a client device 102 communicatively coupled to a website host server 104 through network 106.

Client device 102 can include one or more processors 108 and computer-readable storage media 110. Client device 102 can be embodied as any suitable computing device such as, by way of example and not limitation, a desktop computer, a portable computer, a netbook, a handheld computer such as a personal digital assistant (PDA), a cell phone, and the like.

Computer-readable storage media 110 includes one or more software applications, which can include a software executable module in the form of a web browser 112. Browser 112 can receive content from and send content to other servers, such as website host server 104, via network 106, such as the Internet. Such content can include any suitable type of content that can be received from and sent to websites hosted by servers. In various embodiments, browser 112 is configured to send a request for a web page to be displayed to a user. Browser 112 manages various events during the loading and rendering of the web page. Events can include, for example, an onload event to indicate that the web page is loaded, events that trigger execution of various portions of page script, and the like. Browser 112 includes parser 114 and tree building module 116. Parser 114 is configured to parse source code for a web page into identifiable tokens and pass the tokens to tree building module 116. Tree building module 116 is configured to create various elements in accordance with the tokens received from parser 114 and enter them into a document object model (DOM) tree for a web page, such as one or more web pages 118. Elements can include, for example, graphics, pictures, lines, tables, interactive buttons, text boxes, frames, and the like.

Web page 118 resides on computer-readable storage media 120 of website host server 104. In addition to web page 118, computer-readable storage media also includes a content selection module 122 configured to select one or more content items, such as advertisements, to be displayed within advertisement slots of the web page 118. Website host server 104 also includes one or more processors 124 configured to execute the software modules residing on computer-readable storage media 120, e.g., content selection module 122.

Various content items, e.g., advertisements, can be provided to the website host server 104 by one or more content hosting servers 126. Advertisements are but one example of content items that can be provided for inclusion on a web page. Content items can include, by way of example and not limitation, images, videos, multimedia presentations, audio, text, and the like, including combinations of various types of content. Content hosting server 126 can include one or more processors 128 and one or more computer-readable storage media 130, on which a content database 132 resides. Content database 132 stores one or more content items, such as advertisements provided by one or more advertisers, and can transmit the content items through network 106 to the website host server 104 for inclusion in the web page 118. In various embodiments, one or more content items are included in the web page 118 by including a uniform resource locator (URL) for the content item in the source code for the web page 118. When browser 112 processes the source code, such as via parser 114 and tree building module 116, the URL can direct the browser 112 to download the content item from content hosting server 126.

The computer-readable storage media included in each device or server can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7.

Generally, any of the functions described herein can be implemented using software, firmware, hardware, (e.g., fixed logic circuitry), or a combination of these implementations. The terms "module," "functionality," and "logic" as used herein generally represent software, firmware, hardware, or a combination thereof. In the case of a software implementation, the module, functionality, or logic represent program code that performs specified tasks when executed on a processor, (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Having described an example environment, consider now a discussion of asynchronously loading web page content to decrease an amount of time to a browser onload event in accordance with one or more embodiments.

Example Embodiments

Figure 2:
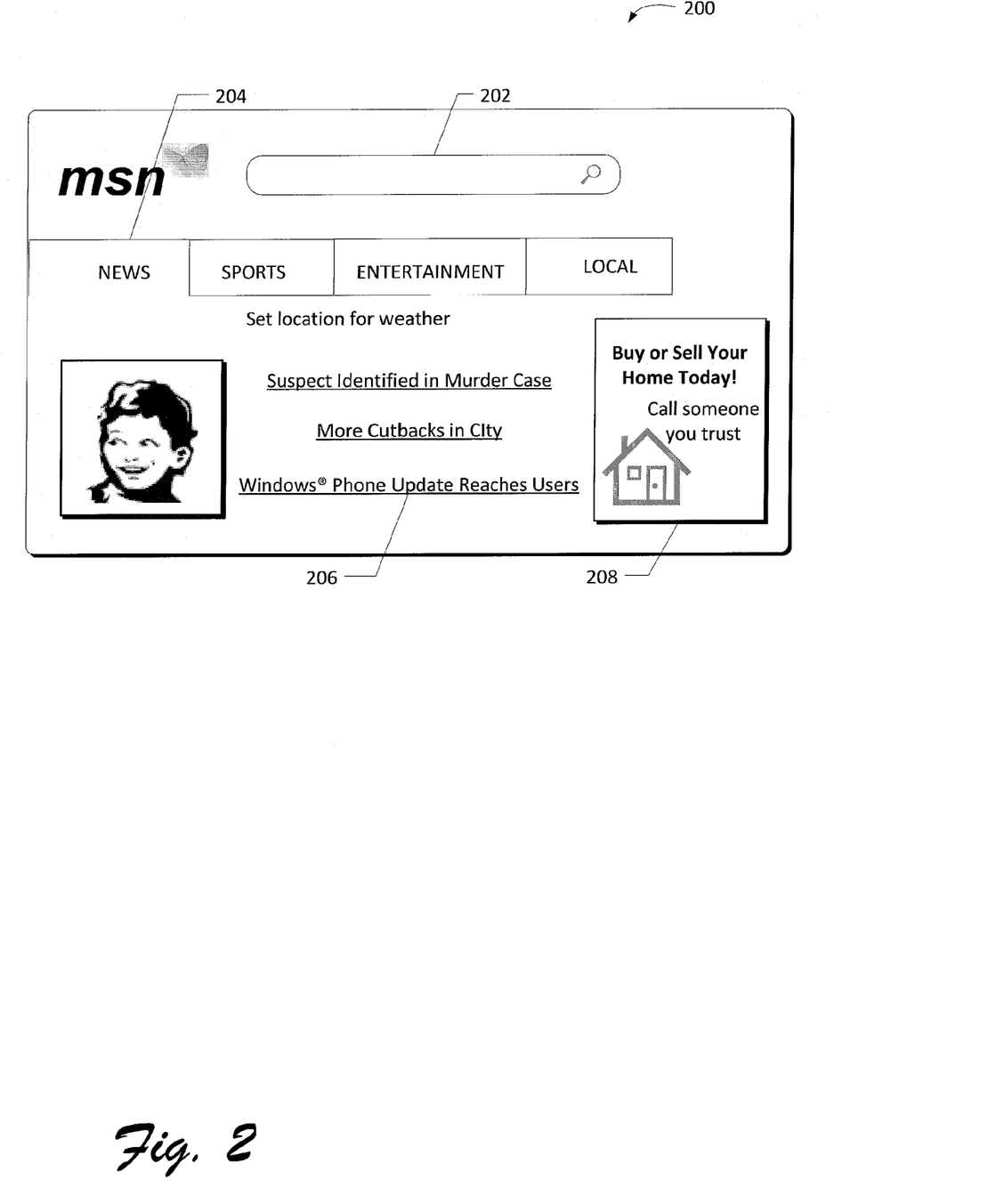
FIG. 2 depicts an example web page in accordance with one or more embodiments.

FIG. 2 illustrates an example web page user interface 200 in accordance with one or more embodiments. While particular features included on a web page user interface can vary, web page user interface 200 includes a search bar 202, various tabs 204, links 206, and an advertisement 208.

As briefly described above, a content selection module can select one or more content items, such as links 206 or advertisement 208 to be included for display on web page user interface 200. The number of content items that can be displayed can vary depending on the particular embodiment. For example, in addition to selecting links and advertisements, the content selection module can also select images, graphics, multi-media components, or the like for inclusion on the web page user interface.

In various embodiments, hypertext markup language (HTML) that codes the web page for display as the web page user interface 200 can include an object that is a frame, and the content selection module can select content to be displayed within the frame. For example, the content selection module can select a content item, such as advertisement 208, that is to be included in a frame, (e.g., an internal or inline frame ("iframe")) on the web page user interface 200. Other types of frames can be utilized, depending on the particular embodiment.

A web page onload event can be triggered by a browser (e.g., browser 112) when the browser expects no further changes to the web page's document object model (DOM). For example, the browser may trigger an onload event when content on the web page has been loaded, nested content items have been loaded, triggered page script running code has successfully terminated, files have been parsed, and when internal objects, (e.g., frames) that trigger onload events terminate with their own onload events. In various embodiments, browser 112 can trigger a web page onload event when each frame of the web page has been loaded and triggers an individual frame onload event. In other words, the web page onload event is dependent on the onload events of various frames of the web page.

In various embodiments, a time to a web page's onload event can be reduced by utilizing empty frames that defer loading of actual content until after the frame's onload event, rather than utilizing frames that load content immediately. For example, advertisement 208 can be loaded by creating an empty frame that will download content only after the frame's onload event has occurred.

Figure 3:
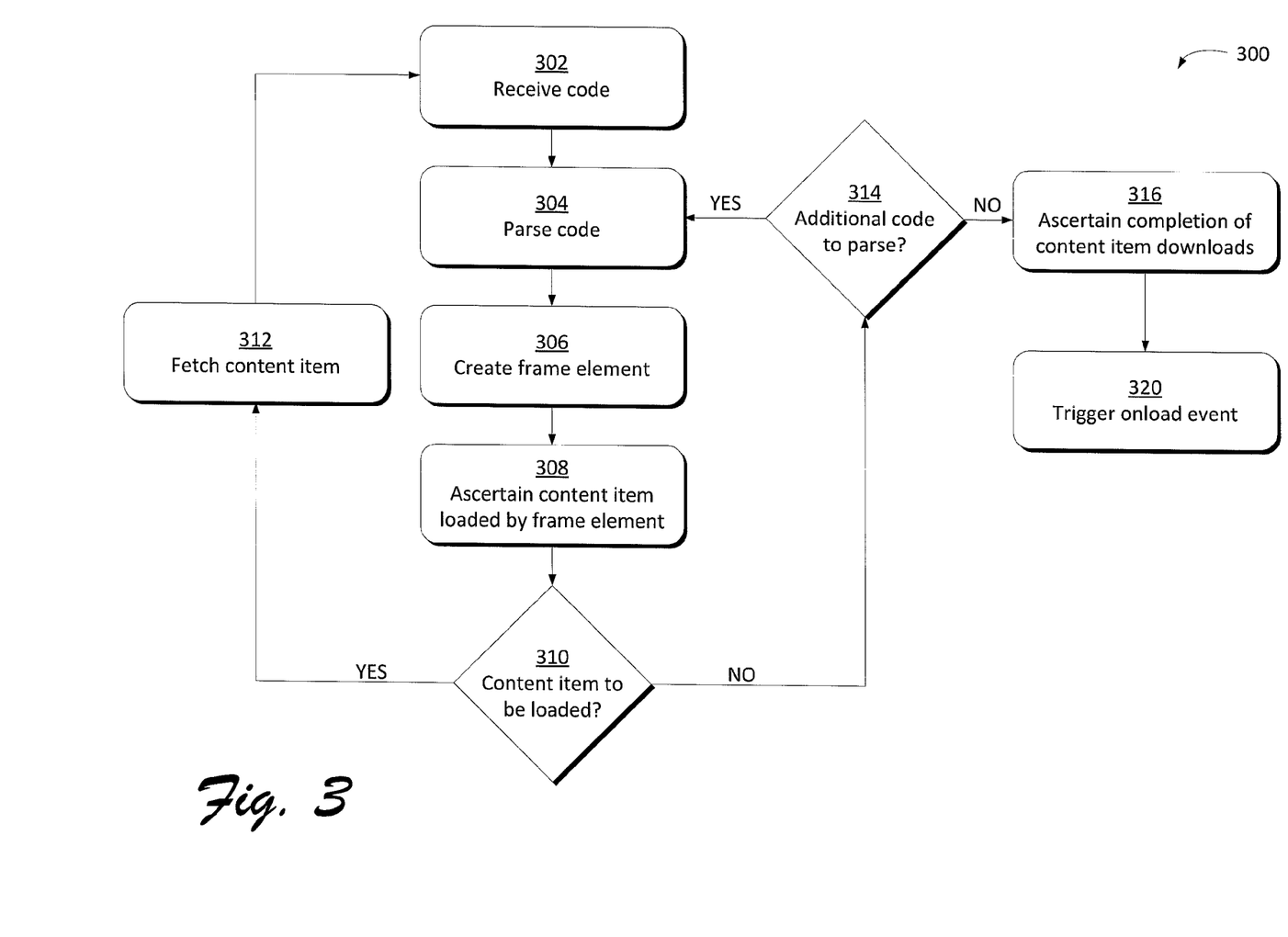
FIG. 3 is a flow diagram of an example process for loading a web page in accordance with one or more embodiments.

FIG. 3 is a flow diagram of an example process 300 for asynchronously loading a content item utilizing an empty frame in accordance with one or more embodiments. The process can be implemented in connection with any suitable hardware, software, firmware, or combination thereof. In at least some embodiments, the process can be implemented in software.

Block 302 receives code for a web page. This can be performed in any suitable way. For example, browser 112 can receive HTML that codes web page 118.

Block 304 parses the code. This can be performed in any suitable way. For example, browser 112 can send the code to parser 114 for parsing. Parsing the code enables a document object model (DOM) tree to be built.

Next, block 306 creates a frame element. This can be performed in any suitable way. For example, tree building module 116 of browser 112 can receive a frame token from the parser 114 and add the frame to a document object model (DOM) tree for the web page, as it builds the DOM tree.

Block 308 ascertains whether content items are to be loaded by the frame element. If there is a content item to be loaded by block 310, block 312 fetches the content item. This can be performed in any suitable way. For example, a request for the code of the content item can be transmitted via the network to content hosting server 126. The process then returns to block 302, where the code for the content item is received.

If there is no content item to be loaded by block 310, for example, if the frame element is empty, block 314 determines if there is additional code to be parsed. If there is additional code to be parsed, the process returns to block 304 to parse the code.

If, however, there is not additional code to be parsed, block 316 ascertains the completion of the content item downloads. This can be performed in any suitable way. For example, the system can detect that each of the elements, including those that did not load content items, has fired an individual load event. Finally, block 320 triggers a web page onload event. This can be performed in any suitable way.

Figure 4:
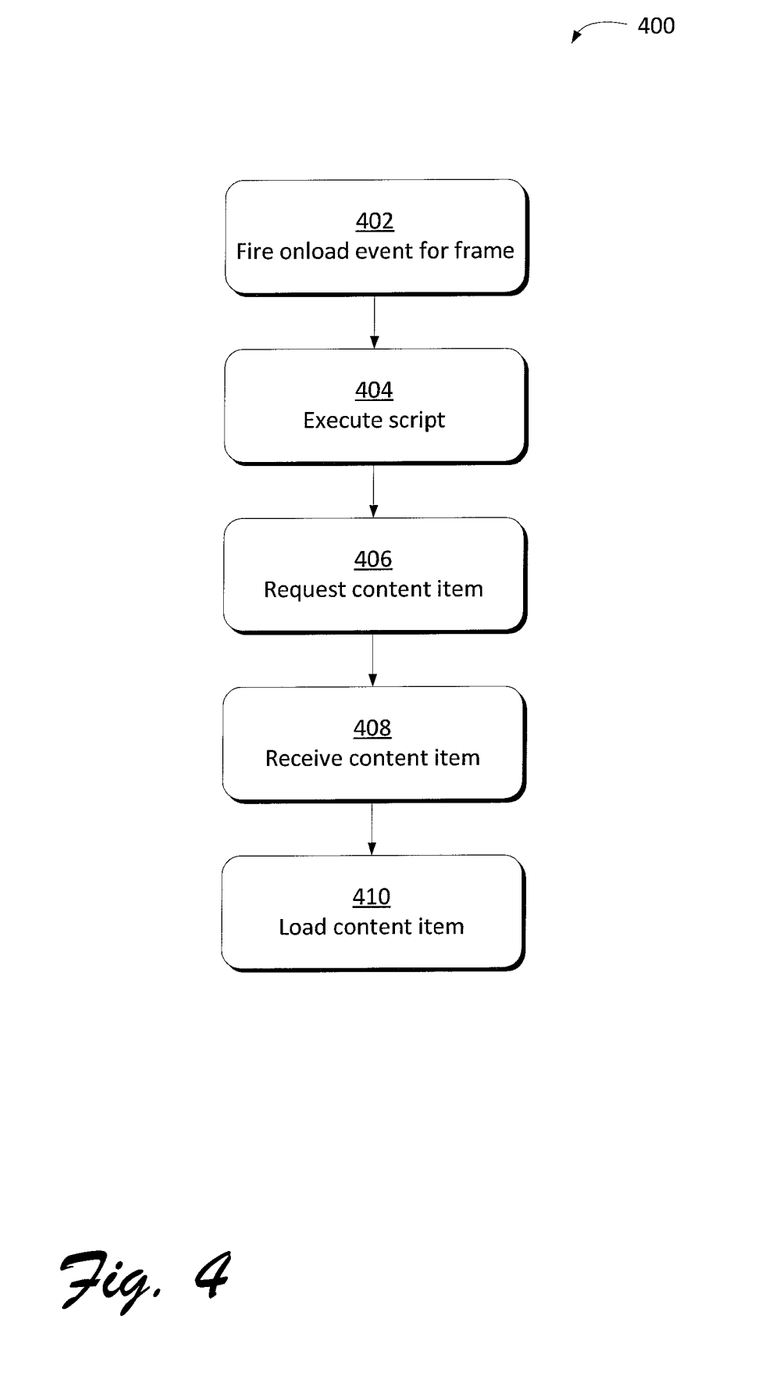
FIG. 4 is a flow diagram of an example process for loading content into a frame after the browser has fired an onload event for the frame in accordance with one or more embodiments.

In various embodiments, content items, such as advertisements, can be loaded by a frame after the frame has fired its individual load event. FIG. 4 describes an example process 400 for loading a content item after an associated frame has fired its individual load event. The process can be implemented in connection with any suitable hardware, software, firmware, or combination thereof. In at least some embodiments, the process can be implemented in software.

Block 402 fires an onload event for the frame. This can be performed in any suitable way. For example, the browser can fire an onload event to indicate that the frame has been loaded. In various embodiments, the frame is created with empty content, enabling the onload event to be fired just after the frame element is created. Once the onload event for the frame occurs, the web page onload event is no longer dependent on it.

Responsive to block 402 firing an onload event, block 404 executes script that can cause one or more functions to be performed. This can be performed in any suitable way. For example, the firing of the onload event of the frame can trigger a script, (e.g., JavaScript) to be executed. The script can, for example, alter the source for the frame in the DOM tree for the web page. In various embodiments, the source can be altered so as to direct the frame to content stored on the content hosting server 126, such as an advertisement.

Block 406 requests a content item. This can be performed in any suitable way. For example, altering the source for the frame in the DOM tree can cause initiation of a request for the content item from the source.

Block 408 receives the content item to be loaded using the frame. This can be performed in any suitable way. For example, an advertisement can be received from the content hosting server 126. Finally, block 410 loads the content item into the frame. This can be performed in any suitable way. For example, the content item, (e.g., advertisement) can be downloaded and presented to a user via browser 112 within the frame. In one or more embodiments, using the frame can be performed by loading the content item into the frame. In other embodiments, using the frame can be performed by loading the content item into a second frame that is nested within the first.

It should be noted that process 400 can be performed for each frame within the web page in a parallel fashion. For example, if a web page includes two frames, the first frame can begin process 400 at the same or a different time than the second frame. Additionally, because onload events for each frame have been fired, the browser can fire the onload event for the web page at any time after each frame's individual onload event was fired. In some embodiments, the web page onload event can be fired before each frame has completed process 400, e.g., before the content item for each frame has been loaded.

Figure 5:
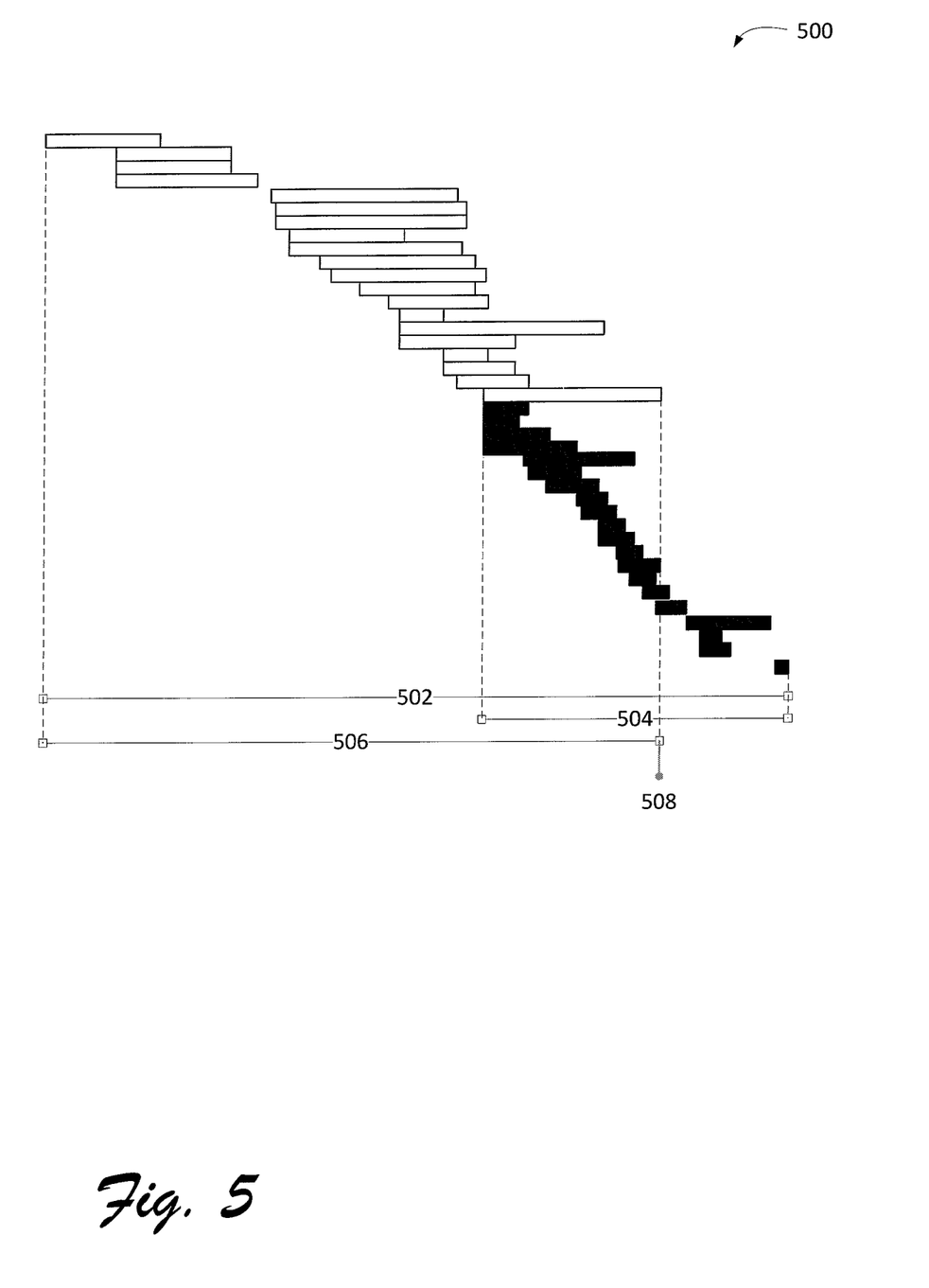
FIG. 5 depicts an example timeline in accordance with one or more embodiments.

FIG. 5 illustrates an example timeline 500 for loading a web page in accordance with one or more embodiments. In FIG. 5, the horizontal open bars represent the loading of various elements on the base web page, e.g., HTML, style sheets, etc. The horizontal filled bars represent the loading of various content items, such as advertisements. Line 502 represents the total time to load the web page. Line 504 represents the time to load the various content items. For example, on a web page including various frames that load advertisements asynchronously, line 504 can represent the time from when the first frame fires its onload event until the time when the last frame on the web page has completed loading the advertisement. Line 506 represents the time to load the various elements on the base web page. For example, line 506 can represent the time from the receipt of the HTML source code for a web page until the time when the browser fires the onload event for the last element (e.g., frame). Point 508 represents the firing of the web page onload event.

As can be seen in FIG. 5, process 300 for loading a web page, culminating in the firing of an onload event for the web page, and process 400 for loading content into empty frames can be conducted in an asynchronous manner, and in parallel with one another. By decoupling the web page onload event from the loading of content items, such as advertisements, the time to achieve the web page onload event can be reduced. For example, if content items were loaded directly into the frames before the individual frames could fire their onload event, the time to achieve the web page onload event would be the time represented by line 502, rather than the time represented by line 506. Furthermore, if the loading of content items into frames was delayed until the web page onload event was fired, the total time to load the web page would be increased, and resources could be wasted waiting for the web page onload event to be fired. However, in accordance with various embodiments, by beginning to load content into each frame in response to the browser firing the onload event for the frame, a balance can be achieved.

The timing of the firing of the web page onload event with respect to the loading of the content item using a frame can vary depending on the particular embodiment. Assume, for example, that the content item to be loaded using the frame is an advertisement. In some embodiments, such as where the web page includes mostly text, the web page onload event can be fired during the execution of a page script to load the advertisement into a frame or before the advertisement is loaded. In other embodiments, such as when there is another element on the page that is taking a relatively long time to load, such as a large image or multi-media item, the web page onload event can be fired after the advertisement has been loaded into the frame.

In various embodiments, content items, such as advertisements, loaded into a frame of a web page can utilize a "document.write" method of coding. In these embodiments, a nested frame approach can be used to reduce or mitigate compatibility issues, including a failure to load advertisements. For example, assume that a frame is loaded as an empty frame and, responsive to firing an onload event for the frame, a script is executed to load an advertisement utilizing document.write coding. Because a document.write statement that runs after the frame onload event has been fired will result in the browser creating a new document for the frame, the browser will again wait for the frame to load before it will fire the onload event for the web page. To avoid this dependency on the onload event while allowing advertisements to use document.write coding, in various embodiments, a second "nested" frame can be created within the frame on the web page, and the content item will be loaded into the second frame. The nested frame can be created without using document.write coding and, therefore, the browser will consider the outer frame complete for the purpose of firing a web page onload event.

Figure 6:
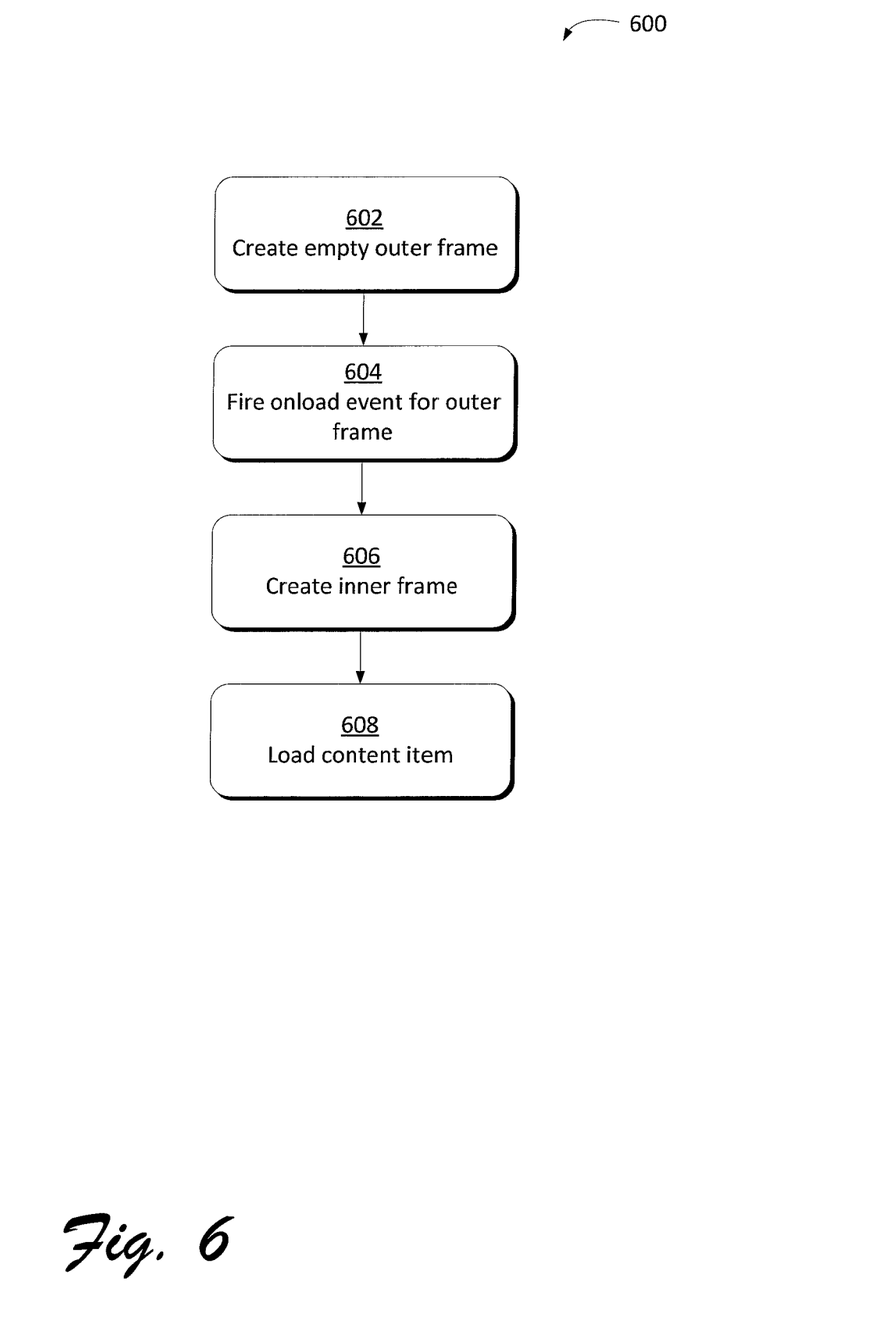
FIG. 6 is a flow diagram of an example process for utilizing nested frames in accordance with one or more embodiments.

FIG. 6 illustrates an example process 600 for utilizing nested frames in accordance with one or more embodiments. The process can be implemented in connection with any suitable hardware, software, firmware, or combination thereof. In at least some embodiments, the process can be implemented in software.

Block 602 creates an empty outer frame. This can be performed in any suitable way. For example, tree building module 116 can create a frame element with empty contents and enter the frame element into the DOM for the web page.

Block 604 fires an onload event for the outer frame. This can be performed in any suitable way. For example, the onload event for the outer frame can be fired when the element is entered into the DOM tree.

Next, block 606 creates an inner frame. This can be performed in any suitable way. For example, the firing of the onload event for the outer frame can trigger a page script including the following code:

innerFrame=document.createelement("iframe");
    outerFrame.body.appendChild(innerFrame);
    innerFrame.parent=outerFrame.parent or something similar. The script can create or launch a nested, or inner frame within the first outer frame without delaying the onload event of the web page. The line of code "innerFrame.parent=outerFrame.parent" can ensure that when the advertisement or other content item references the parent of the frame, it will work as if the parent was the web page rather than a frame.

Block 608 loads the content item, such as an advertisement. This can be performed in any suitable way, examples of which are provided above.

With the foregoing examples of various embodiments for asynchronously loading content items for a web page in mind, consider the follow description of an example device that can be utilized to implement the embodiments described above.

Example Device

Figure 7:
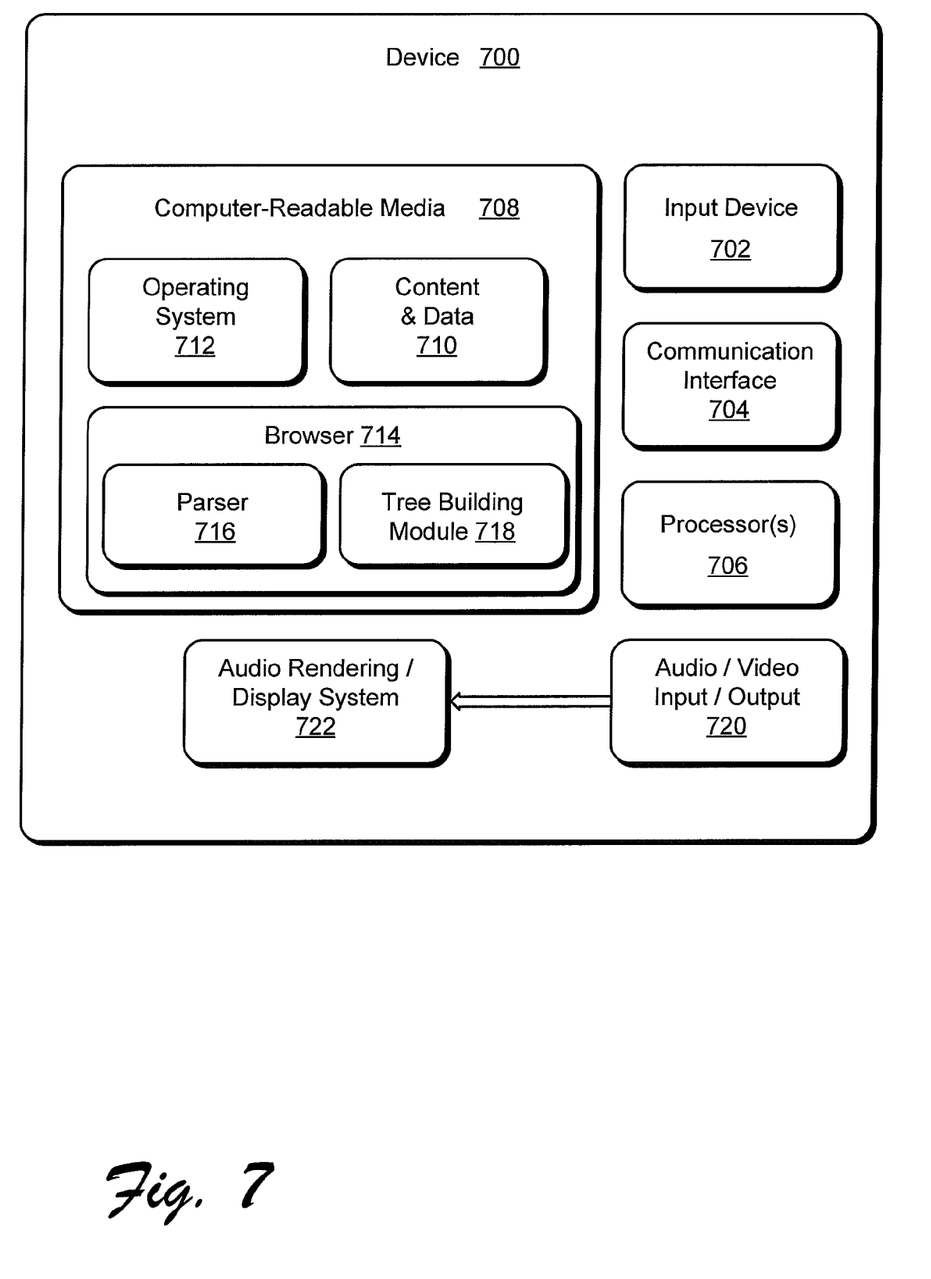
FIG. 7 illustrates an example device that can be used to implement one or more embodiments.

FIG. 7 is a block diagram of an example device 700 that can be used to implement one or more embodiments. In one or more embodiments, device 700 can be implemented as a client device, such as client device 102 in FIG. 1.

Device 700 includes input device 702 that may include Internet Protocol (IP) input devices as well as other input devices, such as a keyboard. Device 700 further includes communication interface 704 that can be implemented as any one or more of a wireless interface, any type of network interface, and as any other type of communication interface. A network interface provides a connection between device 700 and a communication network by which other electronic and computing devices can communicate data with device 700. A wireless interface can enable device 700 to operate as a mobile device for wireless communications.

Device 700 also includes one or more processors 706, (e.g., any of microprocessors, controllers, and the like) which process various computer-executable instructions to control the operation of device 700 and to communicate with other electronic devices. Device 700 can be implemented with computer-readable media 708, such as one or more memory components, examples of which include random access memory (RAM) and non-volatile memory, (e.g., any one or more of a read-only memory (ROM), flash memory, EPROM, EEPROM, etc.). A disk storage device may be implemented as any type of magnetic or optical storage device, such as a hard disk drive, a recordable and/or rewriteable compact disc (CD), any type of a digital versatile disc (DVD), and the like.

Computer-readable media 708 provides data storage to store content and data 710, as well as device executable modules and any other types of information and/or data related to operational aspects of device 700. One such configuration of a computer-readable medium is signal bearing medium and thus is configured to transmit the instructions, (e.g., as a carrier wave) to the hardware of the computing device, such as via the network 106. The computer-readable medium may also be configured as a computer-readable storage medium and thus is not a signal bearing medium. Examples of a computer-readable storage medium include a random access memory (RAM), read-only memory (ROM), an optical disc, flash memory, hard disk memory, and other memory devices that may use magnetic, optical, and other techniques to store instructions and other data. The storage type computer-readable media are explicitly defined herein to exclude propagated data signals.

An operating system 712 can be maintained as a computer executable module with the computer-readable media 708 and executed on processor 706. Device executable modules can also include a browser 714 which can include a parser 716 and a tree building module 718 that operate as described above and below.

Device 700 also includes an audio and/or video input/output 720 that provides audio and/or video data to an audio rendering and/or display system 722. The audio rendering and/or display system 722 can be implemented as integrated component(s) of the example device 700, and can include any components that process, display, and/or otherwise render audio, video, and image data.

As before, the blocks may be representative of modules that are configured to provide represented functionality. Further, any of the functions described herein can be implemented using software, firmware, (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor, (e.g., CPU or CPUs). The program code can be stored in one or more computer-readable storage devices. The features of the techniques described above are platform-independent, meaning that the techniques may be implemented on a variety of commercial computing platforms having a variety of processors.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A computer-implemented method comprising:
creating a plurality of elements for a web page, one of the plurality of elements comprising a first frame, the first frame having empty content;
responsive to an occurrence of an onload event for the first frame, executing a script effective to create a second frame within the first frame and cause a content item to be loaded using the second frame; and
triggering a web page onload event for the web page responsive to ascertaining an occurrence of an onload event corresponding to each of the plurality of elements but before the content item is loaded using the second frame.

2. The computer-implemented method of claim 1, wherein executing the script is also effective to cause an advertisement to be loaded using the second frame.

3. The computer-implemented method of claim 1, wherein triggering the web page onload event occurs after the occurrence of the onload event corresponding to each of the plurality of elements, but before executing the script has completed.

4. The computer-implemented method of claim 3,
wherein the content item comprises at least one of an advertisement, an image, a video, a multimedia presentation, audio, or text.

5. The computer-implemented method of claim 1, further comprising loading content for at least one of the plurality of elements, wherein the onload event corresponding to the at least one element does not occur until loading content for the at least one element is completed.

6. The computer-implemented method of claim 5, the content item comprising at least an advertisement, an image, a video, a multimedia presentation, audio, or text.

7. The computer-implemented method of claim 1, wherein the script is effective to create a plurality of frames nested within the first frame, the plurality of frames including the second frame, and cause a content item to be loaded using each of the plurality of nested frames.

8. A system comprising:
a computing device;
one or more processors; and
one or more computer-readable storage devices comprising instructions that are executable by the one or more processors to cause the computing device to perform a process comprising:
receiving code corresponding to a web page;
parsing the code effective to generate one or more tokens;
creating a plurality of elements according to the tokens, one of the plurality of elements comprising a first frame, the first frame having empty content;
responsive to an occurrence of an onload event for the first frame, executing a script effective to create a second frame within the first frame and cause a content item to be loaded using the second frame; and
triggering a web page onload event for the web page responsive to ascertaining an occurrence of an onload event corresponding to each of the plurality of elements but before the content item is loaded using the second frame.

9. The system of claim 8, wherein triggering of the web page onload event occurs after the occurrence of the onload event corresponding to each of the plurality of elements, but before executing the script has completed.

10. The system of claim 8, wherein the content item comprises at least one of an advertisement, an image, a video, a multimedia presentation, audio, or text.

11. The system of claim 8, wherein the process further comprises:
loading content for at least one of the plurality of elements, wherein the onload event corresponding to the at least one element does not occur until loading content for the at least one element is completed.

12. The one or more computer-readable storage media of claim 8, wherein the script is effective to create a plurality of frames nested within the first frame, the plurality of frames including the second frame, and to cause a content item to be loaded using each of the plurality of nested frames.

13. A device comprising:
one or more processors;
one or more computer-readable storage devices;
one or more modules embodied on the one or more computer-readable storage devices and executable under the influence of the one or more processors, the one or more modules configured to:
create a plurality of elements for a web page, one of the plurality of elements comprising a first frame, the first frame having empty content;
execute, responsive to an occurrence of an onload event for the first frame, a script effective to create a second frame within the first frame and cause a content item to be loaded using the second frame; and
trigger a web page onload event for the web page responsive to ascertaining an occurrence of an onload event corresponding to each of the plurality of elements but before the content item is loaded using the second frame.

14. The device of claim 13, the one or more modules further configured to:
receive source code corresponding to the web page;
parse the source code effective to generate one or more tokens; and
create the plurality of elements for the web page according to the tokens, the plurality of elements comprising the first frame.

15. The device of claim 14, the one or more modules further configured to:
trigger the web page onload event after the occurrence of the onload event corresponding to each of the plurality of elements, but before executing the script has completed.

16. The device of claim 15, wherein the content item comprises at least one of an advertisement, an image, a video, a multimedia presentation, audio, or text.

17. The device of claim 13, the one or more modules further configured to: load content for at least one of the plurality of elements, wherein the onload event corresponding to the at least one element does not occur until loading content for the at least one element is completed.

18. The device of claim 17 wherein the content item comprises at least one of an advertisement, an image, a video, a multimedia presentation, audio, or text.

19. The device of claim 13, wherein the script is effective to create a plurality of frames nested within the first frame, the plurality of frames including the second frame, and to cause a content item to be loaded using each of the plurality of nested frames.

* * * * *